Feb. 17, 1931.  C. PELMULDER  1,793,431
AUTOMATIC STOCK WATERING FOUNTAIN
Filed Sept. 12, 1928
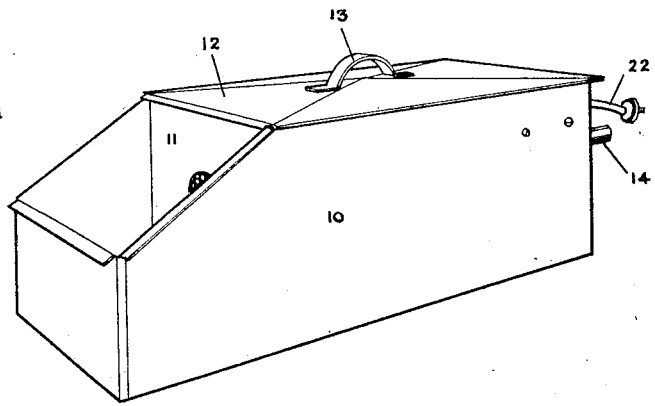
FIG. 1
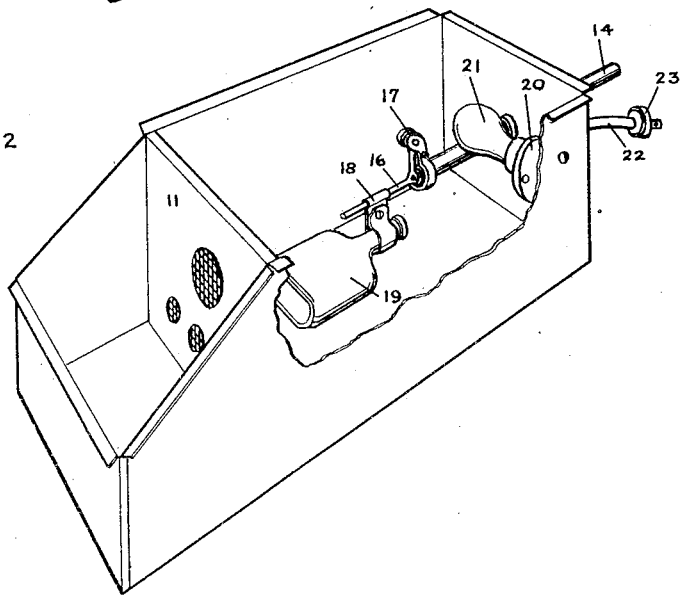
FIG. 2
FIG. 3
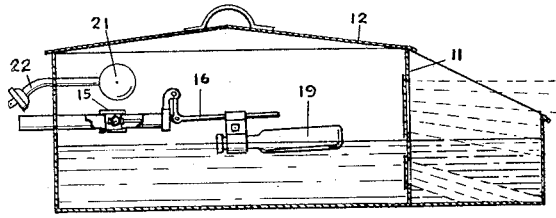
Chas. Pelmulder INVENTOR.
BY Emil F. Lange
ATTORNEYS.

Patented Feb. 17, 1931

1,793,431

UNITED STATES PATENT OFFICE

CHARLES PELMULDER, OF YORK, NEBRASKA

AUTOMATIC STOCK-WATERING FOUNTAIN

Application filed September 12, 1928. Serial No. 305,572.

My invention relates to watering fountains for the use of all kinds of stock.

The primary object of my invention is the provision in a stock watering tank of a combined heating and lighting system for preventing the freezing of the water and for illuminating the water in the fountain so that it will be available to the stock at all hours of the day or night.

Another of my objects is the provision of a novel form of valve and especially of a novel form of float so that the valve is automatically operable and so that the float is readily replaceable whenever a float becomes broken.

Having in view these objects and others which will be pointed out in the following description, I will now refer to the drawings, in which Figure 1 is a view in perspective of the stock watering tank.

Figure 2 is a view similar to Figure 1 but showing the cover removed and having one of the side walls broken away to disclose the interior parts.

Figure 3 is a lengthwise sectional view in diagrammatic form showing particularly the illumination of the water.

The tank 10 is divided by a partition 11 into two compartments one of which is the float compartment and the other the drinking compartment. The upper edges of the walls of the float compartment are turned outward for slidably receiving a lid 12 which covers the float compartment and which is provided with a handle member 13 for convenience in sliding it on or off the tank. The drinking compartment has the upper edges of its side wall inclined as shown in the drawings and the partition 11 is provided with three openings which are covered with reticulated material, as shown at 11'. One of these openings is above the other two and it is larger in diameter than either of the other two. The openings permit the free passage of water therethrough from the float chamber into the drinking chamber and the reticulated material prevents trash from entering into the float chamber. These openings, however, have another very important function which will be subsequently described.

The pipe 14 is adapted to be connected with any suitable source of water supply. It passes through an aperture in the end wall of the float chamber to which it is secured in water tight relation. At its free end inside the float chamber it is provided with an automatic valve at 15 having a stem 16 and a pivotal connection at 17, the arrangement being such that the lifting of the stem 16 closes the valve 15. Connected to the stem 16 is a clip 18 which is adapted to embrace the neck of a whiskey bottle 19. I have selected the whiskey bottle for this purpose for the reason that it is flat and that it presents a large flat surface to the surface of the water so that it is readily buoyant on the water. Another reason for my adoption of the whiskey bottle is that such a bottle possesses sufficient weight to positively open the automatic valve 15 when the water in the float chamber falls below a predetermined level. It should also be noted that the position of the whiskey bottle is such that it increases the leverage action of the stem 16.

Secured inside the float chamber to a side wall thereof is a light socket 20 which is adapted to receive an electric light bulb 21. The socket member 20 is so positioned that the bulb 21 will be in close proximity to the valve 15 so that the heat from the bulb will warm the water in the pipe 14 to prevent the freezing of the water in the valve. A suitable electric light connection 22 passes into the chamber and is connected to the socket 20 and it is provided at its free end with a suitable plug 23 for connection with an electric light socket.

The electric light 21 not only warms the water in the pipe 14 and in the valve 15 but it also warms the entire surface of the water in the float chamber. This is important because freezing usually begins on the surface of the water but the heat from the bulb 21 will prevent the formation of ice on the surface of the water in the float chamber. This is done not only directly but also indirectly by the heat which is reflected downwardly from the inner surface of the lid 12. The bulb 21 has, however, another very important function. The rays of light pass from the bulb through all three of the openings in the partition 11 so as to illuminate the entire body of water in the drinking compartment and also the surface of the water. This illumination is important since many animals like pigs, geese and ducks take frequent drinks both day and night, whenever it is possible for them to do so. Other animals like chickens are early risers and when the fountain is properly illuminated they will drink freely in the early morning hours before it would be light enough for them to find an unilluminated drinking fountain.

Having thus described my invention in such full, clear, and exact terms that its construction and operation will be readily understood by others skilled in the art to which it pertains, what I claim as new and desire to secure by Letters Patent of the United States is:

A drinking fountain for live stock comprising a receptacle having a partition dividing said receptacle into an inlet chamber and a drinking chamber, means terminating within said inlet chamber for connection with a water supply system for conducting water to said inlet chamber, said partition being provided with a plurality of apertures for the passage of water from said inlet chamber to said drinking chamber, screens secured to said partition and covering the apertures thereof for preventing the passage therethrough of trash into said inlet chamber, and a combined lighting and heating member within said inlet chamber whereby the water is kept warm and the rays of light passing through the apertures in said partition will illuminate the water in said drinking chamber.

In testimony whereof I affix my signature.

CHARLES PELMULDER.